United States Patent [19]

Germann

[11] 4,251,745
[45] Feb. 17, 1981

[54] METHOD AND APPARATUS FOR COOLING SUPERCONDUCTIVE WINDINGS OF ELECTRIC MACHINES

[75] Inventor: Willy Germann, Wurenlos, Switzerland

[73] Assignee: BBC Brown, Boveri & Company, Limited, Baden, Switzerland

[21] Appl. No.: 4,868

[22] Filed: Jan. 19, 1979

[30] Foreign Application Priority Data

Jan. 25, 1978 [CH] Switzerland .................... 768/78

[51] Int. Cl.$^3$ .............................................. H02K 9/00
[52] U.S. Cl. ........................................ 310/52; 310/58; 310/214
[58] Field of Search ................... 310/52, 58, 61, 64, 310/65, 214, 215, 10, 40 R

[56] References Cited

U.S. PATENT DOCUMENTS

| | | | |
|---|---|---|---|
| 2,664,512 | 12/1953 | Huntley | 310/64 |
| 2,702,870 | 2/1955 | Norris | 310/64 |
| 2,724,064 | 11/1955 | Kilner | 310/64 |
| 2,749,457 | 6/1956 | Kilner | 310/64 |
| 2,791,707 | 5/1957 | Willyoung | 310/61 |
| 3,821,568 | 6/1974 | Gillet | 310/214 |
| 4,013,908 | 3/1977 | Weghaupt | 310/52 |
| 4,152,610 | 5/1979 | Wallenstein | 310/61 |

*Primary Examiner*—R. Skudy
*Attorney, Agent, or Firm*—Burns, Doane, Swecker & Mathis

[57] ABSTRACT

A cooling arrangement for superconductive windings of electric machines is disclosed where the winding is held in a slot by means of a key. A distribution manifold is provided having distribution ducts adjacent to the key. The axially extending rotor slot is provided with upper and lower collecting ducts in its upper and lower portions respectively which are interconnected with a plurality of generally radially extending cooling ducts. The arrangement insures an efficient cooling with a comparatively simple design.

12 Claims, 7 Drawing Figures

METHOD AND APPARATUS FOR COOLING SUPERCONDUCTIVE WINDINGS OF ELECTRIC MACHINES

BACKGROUND OF THE INVENTION

The present invention relates to rotor windings for electric machines. More particularly, the present invention concerns a method and apparatus for cooling superconductive materials used in windings for electric machines.

In the past, various types of cooling arrangements have been used for the windings of electric machines. In many applications involving conventional conductors, cooling is provided to remove unwanted heat.

Electrical superconductors are now available which exhibit very low resistance to the flow of electrical current. But, these superconductors must, in general, be maintained at cryogenic temperatures by the use of a cryogenic fluid. With superconductive excitation windings, proper cooling of the exciting winding is essential in order to obtain the superconductive properties of the winding material.

Some examples of both rotor and stator windings now in existence are illustrated in "Elektrische Maschinen" by Boedefeld/Sequenz, published by Springer-Verlag in 1971 at pages 347 et seq.

It should be apparent that the need continues to exist for a simple cooling scheme for superconductive windings which efficiently use a cryogenic cooling fluid.

OBJECTS AND SUMMARY OF THE INVENTION

It is a general object of the present invention to provide a cooling arrangement for an electric machine using superconductors which arrangement is particularly effective and simple in design.

It is another object of the present invention to arrange coolant distribution ducts within the superconductor winding to improve the coolant circulation.

Yet another object of the present invention is to provide a superconductor winding in which current leakage paths are lengthened.

In order to achieve the above as well as many other objects, a rotatably mounted rotor of an electric machine is provided with a plurality of axial extending slots within which an electrically conductive superconducting material is positioned. To hold the superconductive winding in the respective slot, a key is provided for each slot. A coolant distribution manifold is also positioned in each slot below the key yet above the winding. The manifold is provided with a plurality of distribution channels which communicate with cooling ducts passing through the superconductive winding.

The distribution channels may be aligned in perpendicular directions on the manifold: one set of channels extending axially and a second set of channels extending circumferentially with respect to the rotor axis.

To provide coolant passages through the superconductor winding, the winding may be divided into a plurality of sections with generally radially aligned spacers between the respective portions. The gaps between the spacers themselves define internally disposed cooling ducts for the winding.

In addition, the winding portions may be covered by insulation layers which lengthen the current leakage path as well as seal the winding portions.

Moreover, a collection manifold can be provided in the root of the slot to assist distribution of the coolant in the passages.

BRIEF DESCRIPTION OF THE DRAWINGS

The above and many other objects of the present invention will be apparent to those skilled in the art when this specification is read in conjunction with the drawings wherein like reference numerals have been applied to like elements and wherein.

DESCRIPTION OF THE PREFERRED EMBODIMENT

Figure 1:
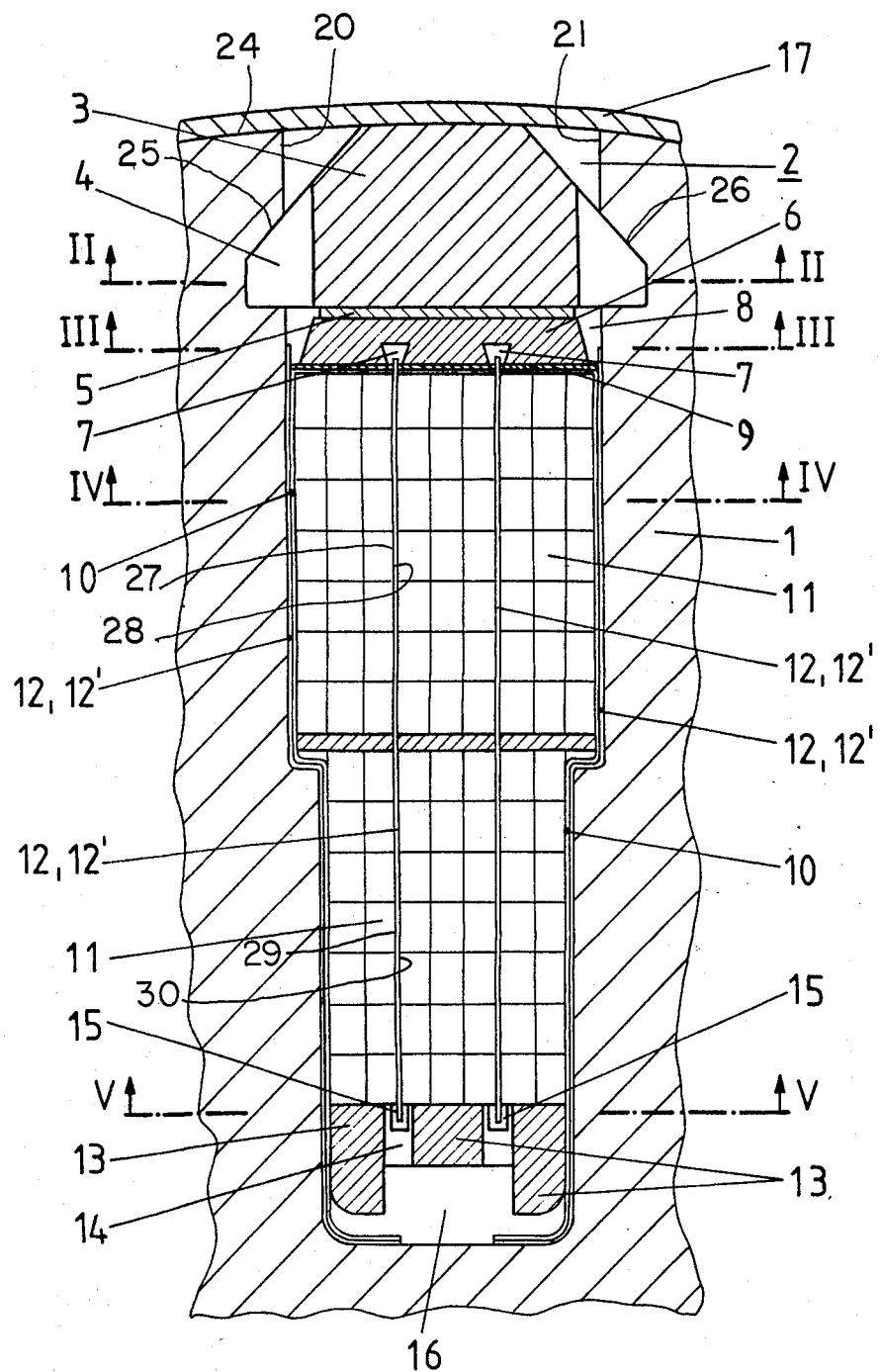
FIG. 1 illustrates in cross-section one slot of a rotor having a superconductive winding.

Turning now to FIG. 1, a rotor 1 of an electric machine is illustrated in partial cross-section. Typically, a rotor I would include a plurality of axially extending slots each of which is the same. Accordingly, the details of one such slot 2 are representative of the details of each other slot and are illustrative of the present invention.

The upper end portion of each slot 2 is substantially closed by a key 3 which extends axially along the slot and adjacent to the rotor surface 24. Preferably, each lateral edge of the key 3 may be received in a corresponding generally trapezoidally configured groove 25, 26 provided in the respective parallel side wall 20, 21 of the slot 2. In this manner, the key 3 is prevented from being expelled radially outwardly under the influence of centrifugal force when the rotor is turning.

Figure 2:
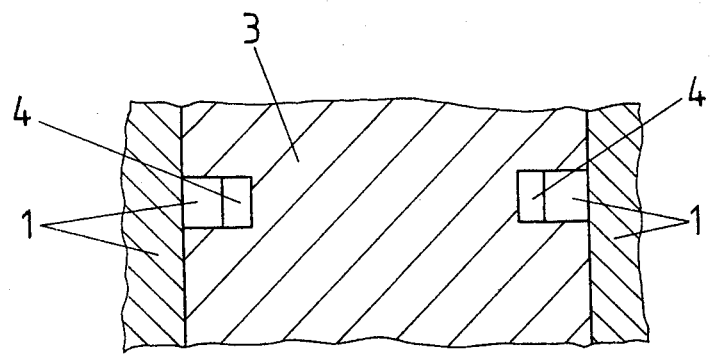
FIG. 2 is a cross-sectional view taken along the line II—II of FIG. 1.

The key 3 may also be provided with a plurality of generally radially directed slots 4 which, as seen in FIG. 2, provide fluid communication radially around the key 3. Moreover, the slots 4 are arranged in pairs along the key 3 maintaining symmetry. As seen in FIG. 2, the radially directed slots 4 are laterally located relative to the longitudinal extent of the key 3.

Surrounding the external rotor surface 24 (see FIG. 1) is a jacket 17 which covers each slot 2 and the associated key 3. Sidewalls 20, 21 of the slot, the key 3 and the inner surface of the jacket cooperate to define a pair of longitudinally directed channels along the rotor. These channels can be used for directing flow of the cooling fluid.

Figure 3:
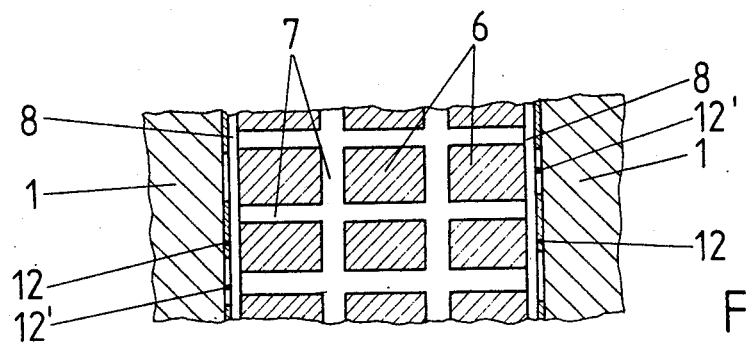
FIG. 3 is a cross-sectional view taken along the line III—III of FIG. 1.

Disposed beneath the key 3 within the slot 2 is a gasket 5 which bears upon the lower surface of the key 3. The gasket also is also arranged in contiguous contact with a distribution manifold 6 that extends axially along the slot 2. On the radially inner-most surface of the distribution manifold 6, a plurality of distribution channels 7 are provided. As seen in FIG. 3, one set of the distribution channels extends longitudinally through the slot 2; the manifold 6 also includes another set of channels extending perpendicularly to the axial or longitudinal channels. Thus, the second set of channels would extend in a generally circumferential direction with respect to the rotor.

Defined between each side of the distribution manifold 6 (see FIG. 1) and the corresponding side 20, 21 of the slot 2 is an upper collecting duct 8. The upper collecting ducts 8 communicate with the radially extending slots 4 through the key 3. In this manner, the cooling fluid can be readily circulated axially through the slot while surrounding the key 3 and the distribution manifold 6 so as to be in fluid communication with the channels 7.

A second gasket 9 separates the distribution manifold 6 from the winding 11. Moreover, the second gasket extends laterally so as to partially define the upper collecting ducts and to partially define the channels 7.

Figure 6:
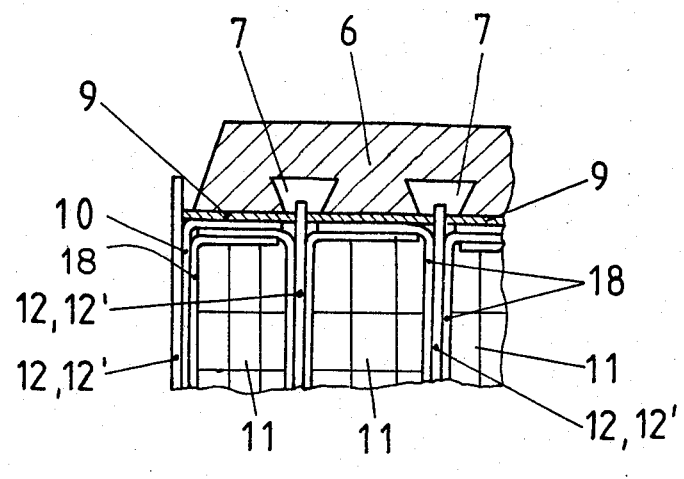
FIGS. 6 and 7 are enlarged detail views illustrating features of FIG. 1.

The winding 11 is fashioned from a superconducting material and is divided into a plurality of axially extending sections, six being shown in FIG. 1. The cross-sections of the winding sections are proportional so that adjacent internal surfaces 27, 28, 29, 30 are in radial alignment. The winding assembly 11 is surrounded by an insulation layer 10 which electrically insulates the winding from the slot 2. As shown in FIG. 6, this layer also wraps the lateral winding sections so as to underlie the second gasket 9.

Figure 4:
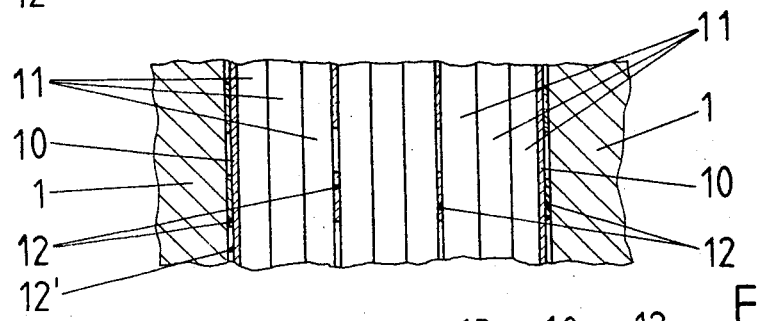
FIG. 4 is a cross-sectional view taken along the line IV—IV of FIG. 1.

In order to provide ducts internally with respect to the superconductive winding, the winding assembly 11 itself is spaced from the sides 20, 21 of the slot 2 by a plurality of radially oriented spacers 12. As seen in FIG. 4, the axial distance 12' between adjacent spacers 12, provides a duct. A plurality of these ducts 12' is defined between the winding assembly 11 and each adjacent wall 21, 22 of the slot 2. Moreover, a plurality of ducts 12' is defined extending radially through the winding at the adjacent internal surfaces thereof. With such an arrangement of internal and peripheral cooling ducts, a cryogenic fluid may circulate through and around the winding assembly 11. At the upper end, each spacer 12 (see FIG. 1) projects through the second gasket 9 and into a manifold channel 7 or an upper collection duct 8. Accordingly, fluid communication between the ducts 12', the channels 7 and the collection ducts 8 is established and maintained.

Figure 5:
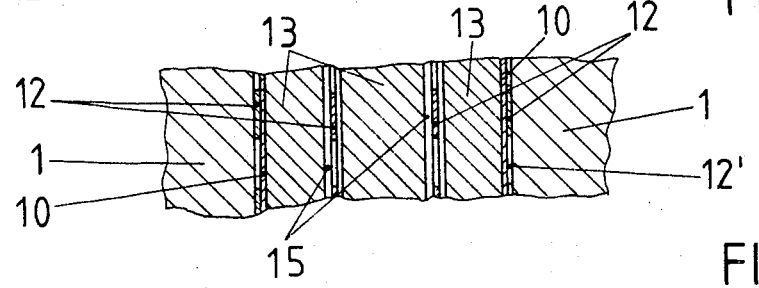
FIG. 5 is a cross-sectional view taken along the line V—V of FIG. 1.

Positioned at the bottom of the winding 11 and within the slot 2 is a lower collecting assembly 13. The lower collecting assembly 13 has bores 14 which extend in a radial direction in alignment to provide fluid communication with the internal cooling ducts 12' formed between the internal spacers 12. In addition, the collecting assembly 13 carries axially extending ducts 15 which communicate with the bores 14 and which receive the lower end of each internal spacer 12 (see FIG. 5). Moreover, between the collecting assembly 13, (see FIG. 1) and the bottom, or root, of the slot 2 there is provided a lower collecting duct 16. This lower collecting duct 16 provides fluid communication between the internal ducts 12' and the external ducts at the bottom of the slot 2.

As seen in FIG. 4, the spacers 12 have a generally rectangular cross-section as do internal and external cooling ducts 12'.

In FIG. 6, insulation details for the winding sections are illustrated in greater detail. It will be seen that each winding section has an insulation layer 18 wrapped therearound. For each upper conductor section 11, the ends of the insulation layer overlap. Moreover, the slot insulation layer 10 is arranged to overlie the winding section insulation layer 18 adjacent to the gasket 9. Each lower winding section is also wrapped by an insulation layer 18 (see FIG. 7). But, for the winding sections adjacent the slot walls 20, 21, the layer 18 also partially covers the collection assembly 13. The slot insulation also partially wraps the collection assembly 13. The foregoing insulation construction is effective to increase the current leakage path and to seal the liquid impregnating enamel.

Figure 7:
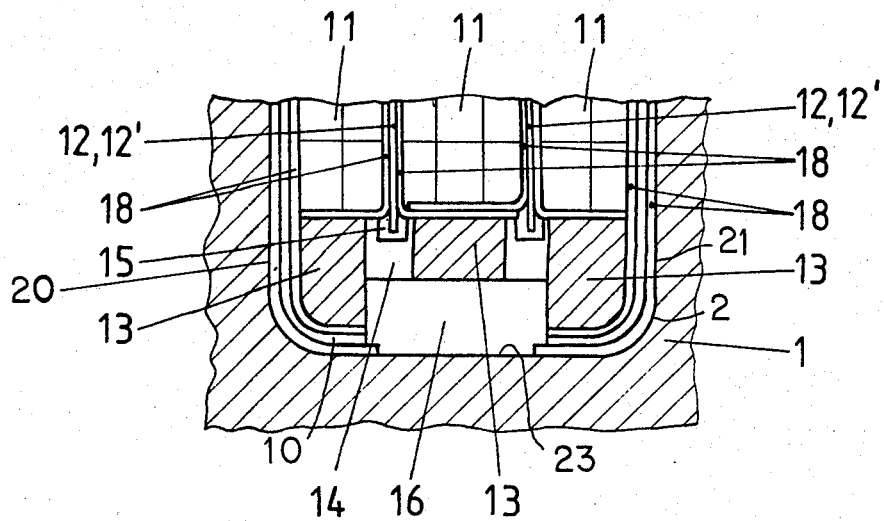

As illustrated in FIG. 7, the rotor 1 is in a rest position. In this configuration, the lower assembly 13 rests against the base 23 of the slot 2 and is insulated therefrom by the layers of insulation 10, 18.

In order to maintain the orientation of the various cooling ducts 12' during assembly, especially when dealing with small sized rotor assemblies, small strips may be temporarily inserted between the respective spacers 12. Such strips may, for example, be made from polytetrafluoroethylene so as to be easily removeable. When the winding assembly has been completed, the positioning strips can be removed and the winding can be keyed into the slot by inserting the key 3.

In operation, a rotor may be provided with superconductive windings disposed in axially extending slots 2 (see FIG. 1) arranged circumferentially around the rotor. The windings 11 and corresponding distribution manifolds 6 are retained by corresponding keys 3.

A suitable conventional cryogenic fluid or liquid may then be supplied to each slot. For example, the channels defined in the distribution manifold can direct the cooling fluid across the winding to laterally disposed upper collection ducts 8. In addition, the cooling fluid can be directed to the internally disposed cooling ducts 12' by the channels 7.

The cooling fluid may also be distributed to the external cooling ducts 12' by the lower collection assembly 13 so as to cool winding sections from the side surfaces as well. The winding sections are cooled with the cryogenic fluid from the top, bottom and sides as well as internally. This cooling is sufficient to permit the superconductive winding material to attain its superconducting properties. The cryogenic fluid may then be collected and removed from the rotor. Of course, a cryogenic liquid may be permitted to remain in the channels and ducts and be replenished only to accommodate portions lost in vaporization, if desired.

It should now be apparent that there has been provided a new and efficient cooling assembly for superconductive windings of rotors. Moreover, it will be apparent to those skilled in the art that numerous modifications, variations, substitutions and equivalants exist for features of the invention which do not materially depart from the spirit and scope of this invention. Accordingly, it is expressly intended that all such modifications, variations, substitutions, and equivalents which fall within the spirit and scope of the invention as defined in the appended claims be embraced thereby.

What is claimed is:

1. An electric machine comprising:
   a rotatably mounted rotor having a plurality of axially-extending slots;
   an electrically conductive winding positioned in each slot and fashioned from a superconductive material;
   a corresponding plurality of keys, each key being positioned in a corresponding slot so as to hold the winding therein;
   a manifold positioned in each slot above the corresponding winding and having distribution channels; and a plurality of radially extending cooling ducts positioned internally of each winding and communicating with the corresponding distribution channels.

2. The machine of claim 1 wherein the distribution channels extend in two directions relative to the rotor, the directions being mutually perpendicular, and the distribution channels intersecting each other.

3. The machine of claim 2 wherein the two directions are respectively, axial relative to the rotor and circumferential relative to the rotor.

4. The machine of claim 1 wherein each key includes a plurality of radially extending channels, each radially extending channel being located laterally of the longitudinal direction defined by the key.

5. The machine of claim 1 wherein each manifold and the sides of the associated slot cooperate to define an upper collecting duct disposed laterally adjacent to the manifold.

6. The machine of claim 1 wherein:
the winding in each slot has a plurality of portions; and spacers are positioned between the winding portions to define internal cooling ducts.

7. The machine of claim 6 wherein spacers are also disposed between the winding portions and the sides of the slot to define external cooling ducts.

8. The machine of claim 1 wherein spacers are disposed between the winding and the sides of the slot to define the cooling ducts.

9. The machine of claim 1 or claim 5 wherein:
the slot has a root portion; and
a lower collecting means for receiving cooling fluid is disposed in the root portion and is connected with the manifold channels by the cooling ducts to ensure proper fluid circulation.

10. The machine of claim 6 wherein:
the winding portions are covered by an insulation layer which is bent at the upper and lower ends to lengthen current leakage paths and seal the windings; and
the spacers are positioned between the insulation layers of adjacent winding portions.

11. A method of cooling a superconductive conductor in a rotor of an electric machine comprising the steps of:
providing a rotor with axially extending slots each having a superconductive winding, a retaining key therein and a distributing manifold between the winding and the key;
supplying a cryogenic fluid to the manifold;
distributing the cryogenic fluid with the manifold to a plurality of cooling ducts extending radially inwardly through the superconductive winding;
passing the cryogenic fluid radially inwardly through the superconductive winding;
cooling the superconductive winding with the cryogenic fluid to attain the superconductive properties of the winding; and
collecting the cryogenic fluid with collection ducts for removal from the rotor.

12. The method of claim 11 further including the step of distributing the cryogenic fluid to cooling ducts between the winding and the sides of the associated slot.

* * * * *